Patented Feb. 23, 1932

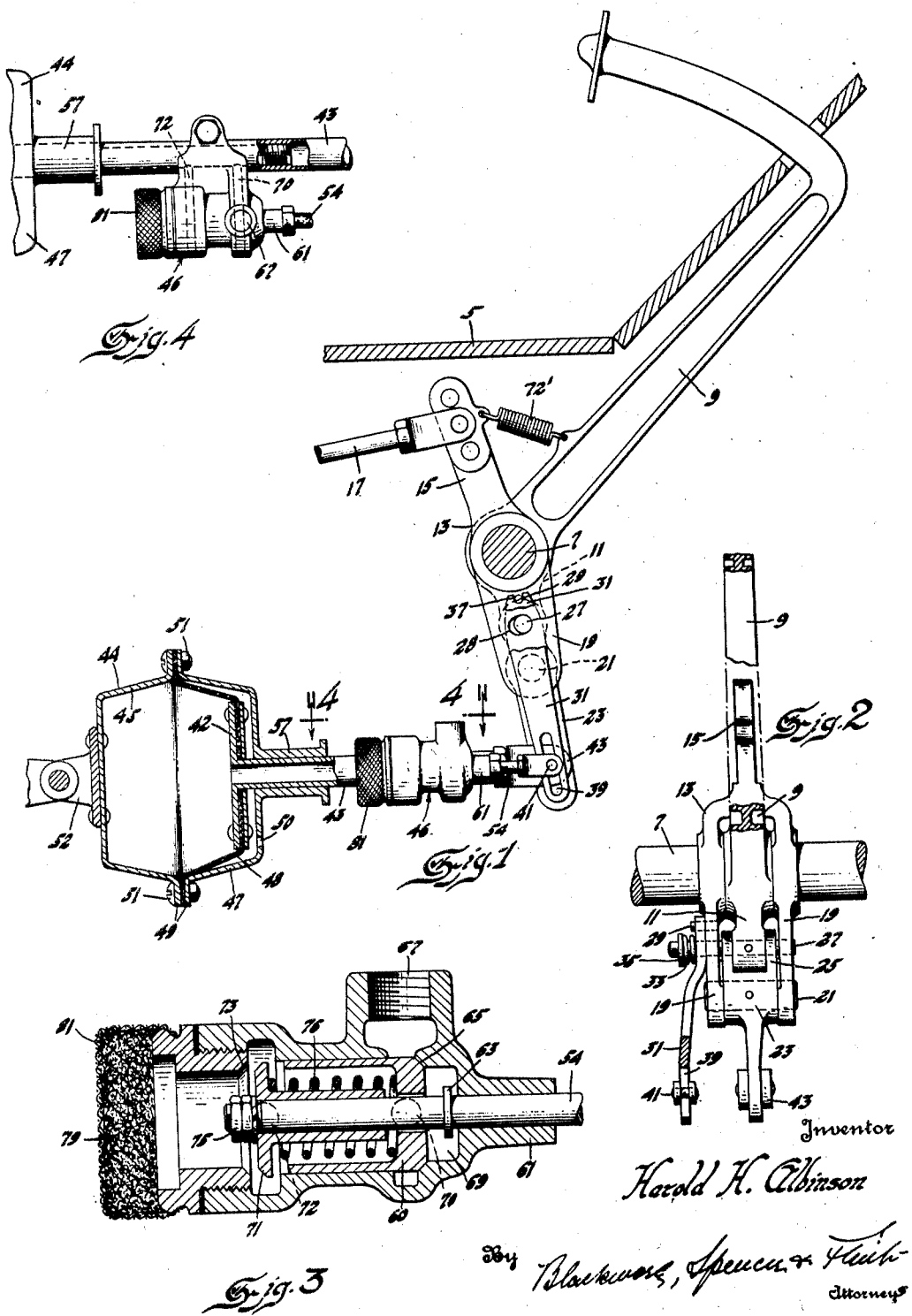

1,846,017

UNITED STATES PATENT OFFICE

HAROLD H. ALBINSON, OF DETROIT, MICHIGAN, ASSIGNOR TO GENERAL MOTORS RESEARCH CORPORATION, OF DETROIT, MICHIGAN, A CORPORATION OF DELAWARE

VACUUM SERVO BRAKE

Application filed August 19, 1929. Serial No. 386,927.

This invention relates to brakes and particularly to an improvement in the mechanism for controlling the brakes of vehicles by fluid pressure.

An object of the invention is to provide operating means for vehicle brakes controlling the action of engine suction which is used to supplement the manually applied forces. Another object is to mount both the pedal and the brake lever on the same pivot fulcrum and to provide means connecting the arms of said pedal and lever whereby the supplementary applied force is controlled.

Other objects and advantages will be understood from the following description.

In the drawings, Figure 1 is a view in side elevation, partly in section. Figure 2 is a view in end elevation. Figure 3 is a vertical section through the control valve. Figure 4 is a view taken as indicated by the line 4—4 of Figure 1.

Referring by reference characters to the drawings, numeral 5 represents a part of the floor board of the body, this being represented merely to show the relation of the operating parts of the device to the vehicle. At 7 is shown a shaft mounted in any convenient way beneath the floor board. Lever 9 is rotatable about shaft 7 and is the manually operated element of the brake mechanism. It may be hand operated or, as shown in the drawings, it may be a pedal extending through the floor board. It has a downwardly directed arm, 11. A second lever, 13, which may be called a brake lever, since it has one arm, 15, connected by a link, 17, to any preferred kind of brake hook-up, is formed at the base of arm, 15, with a pair of spaced arms, 19, apertured to pivot on shaft, 7, one pivotal connection being on each side of the pedal pivot. The extreme ends of arm, 19, are apertured to carry pivot pin, 21, on which rotates a lever, 23, lying generally in parallelism with arms, 19. Lever 23 may be called a re-action lever. This lever, 23, has a forked end, 25, between the arms, 19. The forked end, 25, is pivoted by a pin, 27, to the end of arm 11. Arms 19 are formed with elongated slots, 28, through which pin 27 passes and which slots limit the movement of pin 27. One of the arms, 19, has a pin, 29, projecting therefrom. This pin is located just above pin 27. On the extended end of pin 27 is pivoted a valve operating lever, 31. It is held against the flat face of lever 19 by a spring, 33, engaging the face of the lever and an abutment, 35, carried by pin 27. Lever 31 has a terminal slot, 37, engaging about pin 29. Its lower end is slotted as at 39 to slidingly engage a pin, 41, carried by a yoke on the end of the valve stem, 54. The lower end of lever 23 is connected by a rod, 43, to a plunger, 42, in a power cylinder or chamber, 44. The pressure conditions of the power cylinder are controlled by a valve, 46, the power cylinder being operated by suction, the valve being in a conduit between any preferred source of suction and the power cylinder, 44. The power cylinder is preferably of that type which avoids friction by use of the diaphragm, and one wherein a long stroke is provided in proportion to its diameter by the use of a tapered sleeve type of diaphragm. This unit comprises two cup shaped halves, 45 and 47, having mating flanges, 49, fastening means, 51, securing the flanges together and also securing between the flanges the larger diameter end of the tapered sleeve diaphragm, 48. The plunger, 42, is in the form of a disc. It is of smaller diameter than the ends of the cylinder and to it is secured the smaller end of the tapered sleeve diaphragm. The rod, 43, extends through a guiding sleeve portion, 57, of cylinder element, 47. The cylinder element, 47, may also be provided with an opening for air as shown at 50. The rod, 43, is connected to the lower end of the re-action lever, 23, as explained above. The cylinder element, 45, may have a member, 52, provided with an eye secured thereto for the attachment of the power unit to any convenient part of the vehicle chassis. On one side of rod 43 is carried the valve member, 46. The valve stem, 54, reciprocates through a guiding sleeve, 61. It carries a flange, 63, to at times engage and move a cylindrical valve, 60, and lift it off its seat, 65. When so lifted, the suction of the manifold communicates by a pipe, not shown, with an opening, 67, in the valve body, through the space, 69, opened by suction valve 60 and then by openings 72 into the hollow rod 43, and to the interior of the power cylinder. A second valve, 71, slides on the valve stem, 54, and is to be engaged and lifted off its seat, 73, by nuts, 75, on the end of the stem. When the valve, 71, is off its seat, the outer air is in communication with the power cylinder through the open end, 79, (covered by a dust guard, 81), the open valve, 71, and the second opening, 72, to the hollow rod in the power cylinder. It will be observed from Figure 2 that the connection of rod 43 with lever 23 may be made at any one of the plurality of spaced positions. The slot on the end of lever 31 is arranged to accommodate the selection of one of these pivotal connections. The operation of the device takes place as follows:

Figures 1 and 2 show the parts in their relative position when the brakes are released. When the pedal is depressed, assuming that the resistance offered by the brakes is greater than that offered by the spring, 72', the pedal rotates clockwise relative to the brake lever, 15, which remains stationary. Since lever 15 is not moved, pivot point 21 is fixed and the moving pedal by its connection with re-action lever 23, through the instrumentality of pin 27, swings the lever, 23, in a counter-clockwise direction. The moving pin, 27, swings lever 31 clockwise about its pivot center 29. It will be seen that the valve stem 54 is thereby moved inwardly. This inward movement first permits the spring, 76, to close the air valve, 71, and then by the engagement of the flange, 63, with valve 60, the suction valve will open. This reduces the pressure within the power chamber and permits the air at the right of the plunger 42, to push the plunger to the left and with it the rod, 43. Rod 43 thereupon pulls lever 23 clockwise. This clockwise movement is effective through pin 27 to exert a tendency to rotate pedal 9 in a counter-clockwise direction against the foot of the operator. By this means the operator is made aware of the action of the power brake mechanism. If the operator holds the pedal in its fixed position the pin, 27, carried by the end of the pedal obviously remains fixed. The pull of rod 43 causes lever 23 to swing about fixed pin 27 and through its connection with the brake lever, 15, (this connection being made by pin 21) the brake lever is swung in a clockwise direction to apply the brake through the link, 17. In so doing, pin 29, moving with lever 15, swings lever 31 about pin 27 as a pivot. This swinging of lever 31 is accompanied by a closing of the suction valve. The brake remains applied while the operator holds the pedal depressed. A further pressure on the pedal repeats the above steps, the pin 27 moving in the slot of the brake lever, the suction device operating to apply the brake after which the suction valve closes as the brake lever swings to apply the brake and the pin 27 is again engaged by the right side of the brake lever slot. Should the suction brake fail to operate, there is, of course, no feel of power brake action transmitted to the operator and the pin 27 after engaging the left end of brake lever slot limits the relative movement between the pedal and the brake lever and the pedal pressure operates solely unassisted in applying the brake. If the operator fully releases the pedal, the spring 72' returns the parts to their initial position, as shown in Figure 1 and in so doing the movement of lever 31 opens the air valve, 71, whereby atmospheric pressure fills the power chamber. While the suction power unit is operating the brake, it will be understood that the operator, through additional pressure on the pedal, may supplement the same and increase the intensity of braking action.

The arrangement described above is of particular use in the installation where it is not convenient to associate the valve operating mechanism with the upper arm of the brake pedal in which position it may interfere with other mechanism of the vehicle chassis. In almost any case it is possible to arrange the levers 23 and 31 in the relation shown and described. Not only is this arrangement generally useful, but it permits both the pedal and the brake lever to be rotatably supported on one and the same shaft. The valve is not a part of the invention by itself. The novel operating means mechanism is shown as used with a simple, non-reaction valve, the "feel" being transmitted by the leverage arrangements. The invention is also shown associated with a power cylinder wherein the piston or plunger is connected to the chamber wall by a tapered flexible sleeve, preferably of rubber or rubberized fabric, with the result that friction, such as occurs in the piston type of cylinder, is avoided. The character of the diaphragm also permits a long stroke with a minimum size of power chamber. With a diaphragm of the more common, flat type, its deflection would require a very large chamber to get the necessary changes in volume.

I claim:

1. In the brake operating mechanism, a manually operable lever, a concentrically pivoted brake lever, a re-action lever pivoted to said brake lever, said manually operable lever having an arm pivoted to one arm of said re-action lever, the pivot pin of said arms having a limited movement relative to said brake lever, a power chamber, a plunger therein, having a rod, a connection between said rod and the second arm of said re-action lever, a valve controlling said power chamber and means moved by a relative movement of said brake lever and said pivot pin to actuate said valve.

2. The invention defined by claim 1 said valve member carried by the rod of said plunger.

3. In a brake operating mechanism, a manually operable lever, a pivot shaft therefor, a brake lever having a forked portion, the forks pivoted on said shaft one on each side of said manually operable lever, a re-action lever intermediately pivoted to one end of said brake lever, a brake operating link connected to the other end of said brake lever, a pivot pin connecting the adjacent arms of the manually operated lever and the re-action lever, said forked arms having aligned elongated slots receiving the ends of said pivot pin, a power cylinder, a plunger therein, a plunger rod, said rod connected to an arm of said re-action lever, a valve member having a stem, a valve operating lever pivoted to said brake lever, and apertured to receive said pivoted pin, said stem connected to an arm of said valve operating lever.

4. In combination, a manually operable lever, a pivoted brake lever, said levers having arms extending in substantially parallel relation, a power unit, a control valve therefor, means pivoted to a first one of said lever arms, mechanism carried by the second of said lever arms and adapted, in response to a relative movement between said levers, to rock said pivoted means, a connection between said pivoted means and said valve whereby said pivoted means shall operate said valve to render said power unit active, and a connection between said power unit and said brake lever, said last-named connection including a lever pivotally connected with both lever arms.

In testimony whereof I affix my signature.

HAROLD H. ALBINSON.